D. MASTEN.
Level.
No. 58,271.
Patented Sept. 25, 1866.
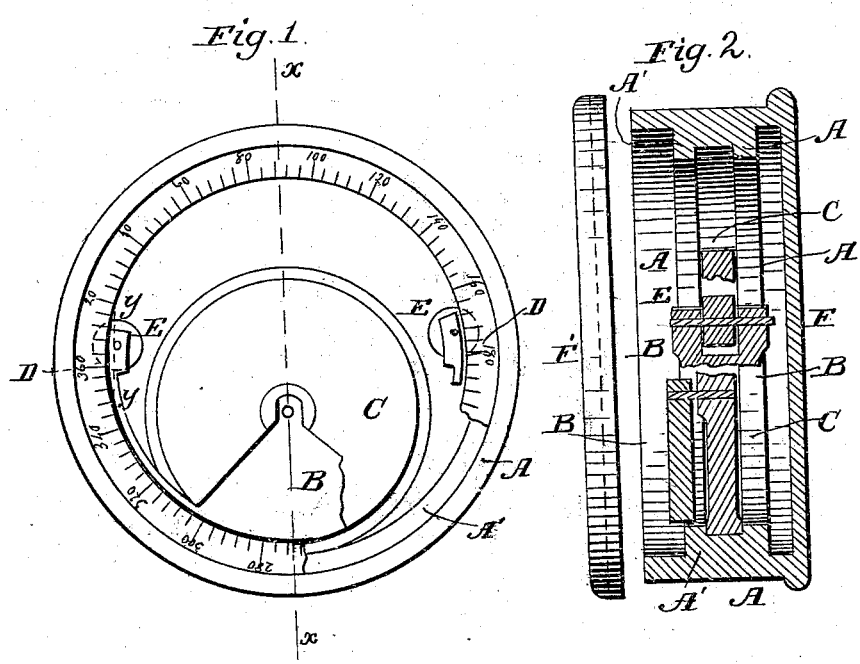
Witnesses:
Inventor:
Daniel Masten
D. P. Hollaway &c
his attys

UNITED STATES PATENT OFFICE.

DANIEL MASTEN, OF BINGHAMTON, NEW YORK.

IMPROVEMENT IN LEVELS.

Specification forming part of Letters Patent No. 58,271, dated September 25, 1866.

*To all whom it may concern:*

Be it known that I, DANIEL MASTEN, of Binghamton, in the county of Broome and State of New York, have invented a new and useful Improvement in Levels; and I do hereby declare that the following is a full, clear, and exact description of the construction and operation of the same, reference being had to the annexed drawings, made part of this specification.

Figure 1 is a front elevation with parts broken away to show other parts. Fig. 2 is a vertical central section on the line $x\,x$, and containing also a section on the line $y\,y$.

The same letters refer to identical parts.

The object of this invention is to make a level operating by gravity, as does the plumb-line, and at the same time to indicate with precision the perpendicular or any angle of elevation.

A is a metallic ring having on its inner face the flanges A' A', on the outer face of which is a scale of degrees and parts of degrees. The inner face of this ring between the flanges must be made perfectly smooth. In this space the wheel C runs, its rim being also highly polished. From the center of this wheel a journal projects, from which is suspended the semicircular piece B. The boxes in which the journal runs should be so constructed as to produce the least possible amount of friction. At the upper points of the piece B are attached the friction-wheels E, and also the pointers D, so placed as to be precisely one hundred and eighty degrees apart. Another point may also be attached at ninety degrees from each of these, which will mark the perpendicular. The shape of this piece B is not at all important. It may be an entire circle or any part thereof not less than a semicircle, and designed in any way.

F and F' are caps, intended to protect the instrument.

The apparatus thus constructed is attached to any ordinary level. It may be attached to a straight-edge from three to five feet long or in any other way to anything for which it is adapted. It should be so set that the index-points shall point to 360° and 180°.

When one end of the straight-edge or other thing to which it may be applied is raised the wheel C rolls over according to the measure of inclination, and the points at once indicate accurately the angle of inclination.

Having fully explained the nature and operation of my improved level, what I claim as my invention, and seek to secure by Letters Patent, is—

The combination of the ring A, with its internal flanges A', piece B, and wheel C, substantially in the manner and for the purpose set forth.

In testimony whereof I have signed my name to this specification in the presence of two subscribing witnesses.

D. MASTEN.

Witnesses:
 F. T. NEWELL,
 H. A. SHELDON.